United States Patent
Otsuka et al.

(10) Patent No.: US 11,545,048 B2
(45) Date of Patent: Jan. 3, 2023

(54) ADVISING APPARATUS, ADVISING METHOD, AND RECORDING MEDIUM

(71) Applicant: CASIO COMPUTER CO., LTD., Tokyo (JP)

(72) Inventors: Toshihiko Otsuka, Tokyo (JP); Takahiro Tomida, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 603 days.

(21) Appl. No.: 16/583,092

(22) Filed: Sep. 25, 2019

(65) Prior Publication Data
US 2020/0105158 A1    Apr. 2, 2020

(30) Foreign Application Priority Data

Oct. 2, 2018    (JP) .............................. JP2018-187505

(51) Int. Cl.
*G06T 7/00* (2017.01)
*G06V 40/16* (2022.01)
(Continued)

(52) U.S. Cl.
CPC ............. *G09B 19/003* (2013.01); *G06F 3/14* (2013.01); *G06T 7/0016* (2013.01);
(Continued)

(58) Field of Classification Search
None
See application file for complete search history.

(56) References Cited

U.S. PATENT DOCUMENTS

2002/0168420 A1* 11/2002 Bolton ................... A61K 35/14
                                                              424/613
2007/0149503 A1*  6/2007 Chaturvedula ...... C07D 409/14
                                                              514/254.01
(Continued)

FOREIGN PATENT DOCUMENTS

JP    H10-201806 A    8/1998
JP    2005-028016 A   2/2005
(Continued)

OTHER PUBLICATIONS

MIT, "MIT Media Lab Medical Mirror", Oct. 1, 2010, URL: https://www.youtube.com/watch?v=LyWnvAWEbWE (Year: 2010).*

(Continued)

*Primary Examiner* — David H Chu
(74) *Attorney, Agent, or Firm* — Fitch, Even, Tabin & Flannery LLP

(57) ABSTRACT

A display device includes a biometric information value acquiring portion, a comparing portion, and a subject state determining portion. The biometric information value acquiring portion subsequently acquires a subject's biometric information value. The comparing portion compares a first biometric information value that is subsequently acquired by the biometric information value acquiring portion with a second biometric information value which is different from the first biometric information value that is subsequently acquired by the biometric information value acquiring portion. The subject state determining portion determines that the user could get a certain improvement owing to the treatment on the user on the basis of a comparison result by the comparing portion.

16 Claims, 9 Drawing Sheets

(51) Int. Cl.
   *G09B 19/00* (2006.01)
   *G06F 3/14* (2006.01)
   *G09B 5/02* (2006.01)

(52) U.S. Cl.
   CPC ............ *G06V 40/161* (2022.01); *G09B 5/02* (2013.01); *G06T 2207/30201* (2013.01)

(56) References Cited

U.S. PATENT DOCUMENTS

| | | | |
|---|---|---|---|
| 2011/0150781 A1* | 6/2011 | Charles | A61K 38/4853 424/94.64 |
| 2015/0366456 A1* | 12/2015 | Takamori | A61B 5/0077 600/479 |
| 2016/0030482 A1* | 2/2016 | Van Den Bos | C12N 15/111 424/93.7 |
| 2016/0100766 A1* | 4/2016 | Yoshioka | A61B 5/0082 600/301 |
| 2018/0042486 A1* | 2/2018 | Yoshizawa | A61B 5/0077 |
| 2018/0110428 A1* | 4/2018 | Murakami | A61B 5/6893 |

FOREIGN PATENT DOCUMENTS

| | | |
|---|---|---|
| JP | 2009-153609 A | 7/2009 |
| WO | 2015/098977 A1 | 7/2015 |
| WO | 2018/088358 A1 | 5/2018 |

OTHER PUBLICATIONS

JPO; Application No. 2018-187505; Notice of Reasons for Refusal dated Sep. 6, 2022.

* cited by examiner (A)          (B)          (C)

←——————— 5 MINUTES ———————→

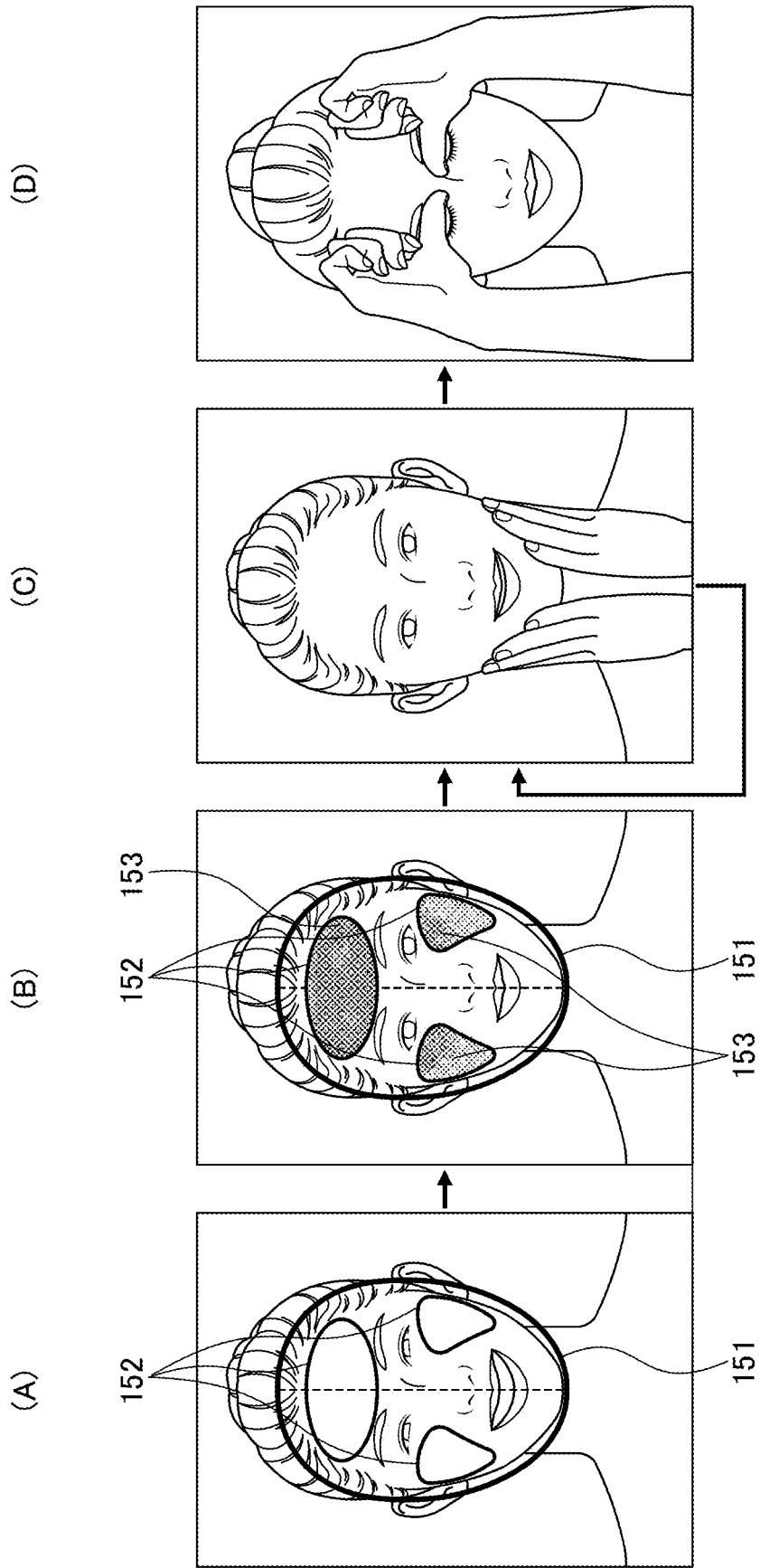

ADVISING APPARATUS, ADVISING METHOD, AND RECORDING MEDIUM

This application is based on and claims the benefit of priority from Japanese Patent Application No. 2018-187505, filed on 2 Oct. 2018, the content of which is incorporated herein by reference.

BACKGROUND OF THE INVENTION

Field of the Invention

The present invention relates to an advising apparatus, a advising method, and a recording medium.

Related Art

Advising apparatuses have been conventionally known that perform a predetermined determination on the basis of biometric information acquired from a user. For example, Japanese Unexamined Patent Application, Publication No. 2009-153609 discloses a technique of quantitatively determining a physical condition of a user on the basis of acquired biometric information.

SUMMARY OF THE INVENTION

According to one aspect of the present invention, an advising apparatus includes a processor, in which the processor is configured to: acquire a user's biometric information value as a first biometric information value from a detection portion that detects biometric information of the user in a non-contact manner; and determine, on a basis of a comparison result generated by comparing the first biometric information value that is acquired, with a second biometric information value after a treatment that is prepared in advance and is obtained in a case of performing the treatment on the user, whether a certain improvement relating to the biometric information of the user is obtained by performing the treatment.

According to another aspect of the present invention, an advising method includes the steps of: acquiring a user's biometric information value as a first biometric information value from a detection portion that detects biometric information of the user in a non-contact manner; and determining, on a basis of a comparison result generated by comparing the first biometric information value of the user that is acquired, with a second biometric information value after a treatment that is prepared in advance and is obtained in a case of performing the treatment on the user, whether a certain improvement relating to the biometric information of the user is obtained by performing the treatment.

According to yet another aspect of the present invention, a non-transitory storage medium encoded with a computer-readable information processing program enables a computer to realize functions of: acquiring a user's biometric information value as a first biometric information value from a detection portion that detects biometric information of the user in a non-contact manner; and determining, on a basis of a comparison result generated by comparing the first biometric information value that is acquired, with a second biometric information value after a treatment that is prepared in advance and is obtained in a case of performing the treatment on the user, whether a certain improvement relating to the biometric information of the user is obtained by performing the treatment.

BRIEF DESCRIPTION OF THE DRAWINGS

FIG. 10 is a schematic view illustrating a transition of a display example in display control processing executed by a display device according to an embodiment of the present invention.

DETAILED DESCRIPTION OF THE INVENTION

Figure 1:
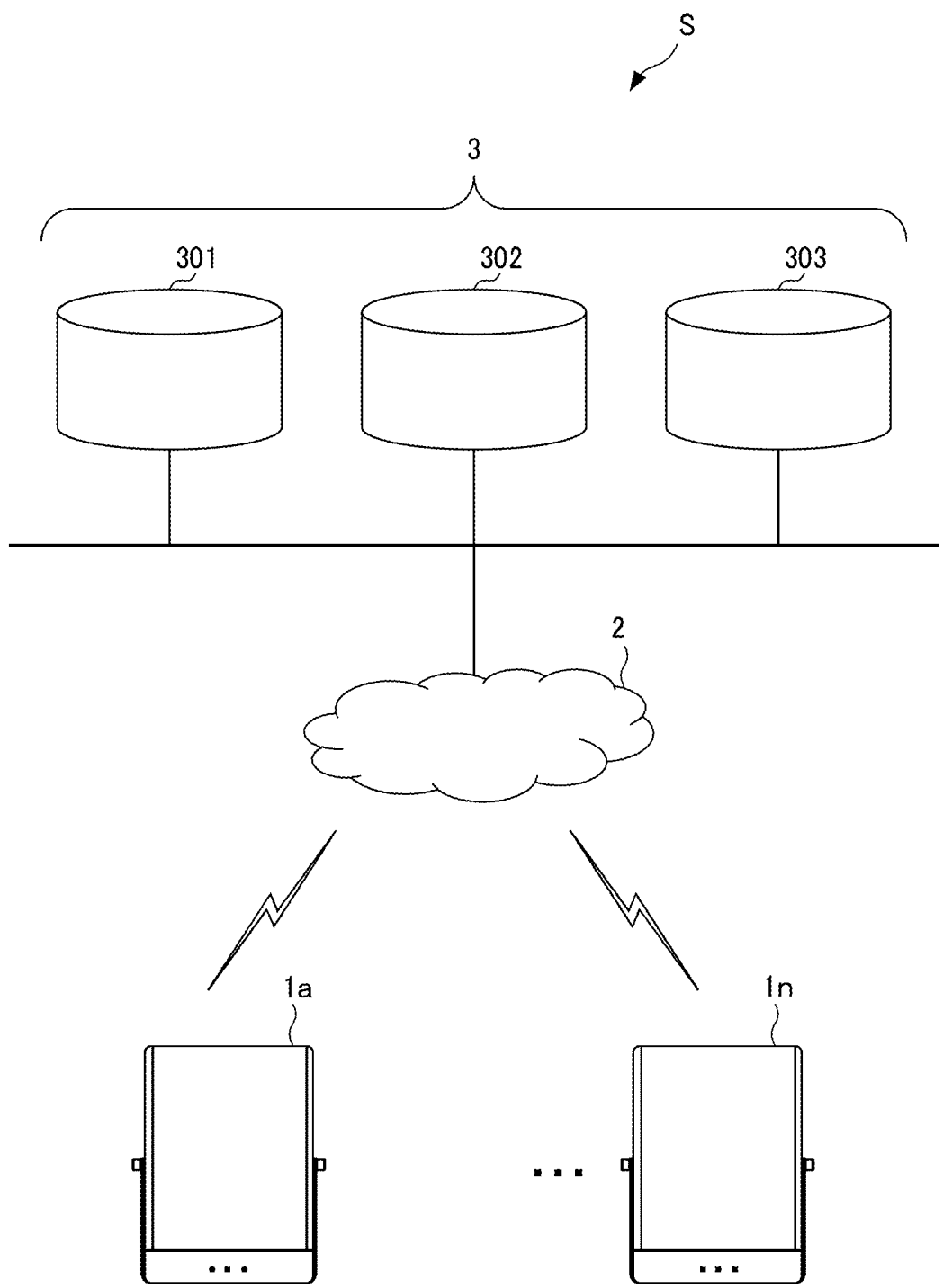
FIG. 1 is a configuration diagram illustrating the configuration of a display system according to an embodiment of the present invention.

Hereinafter, an embodiment of the present invention will be described with reference to the drawings.

Summary of Embodiment

A display device 1 according to an embodiment of the present invention is configured as a self-standing mirror stand that can be carried by a user. Furthermore, the display device 1 performs guidance to a user who visually recognizes a mirror by superimposing predetermined information such as a guide image displayed on a display portion on a mirror image reflected on a mirror portion. The user can perform a treatment corresponding to the guidance (for example, massage, pressure point pressing, or facial training) while referencing a mirror image of the user's own face.

The display device 1 includes an image capturing portion, and the image capturing portion captures the user's face as a subject. A CPU in the display device 1 performs face tracking of the captured user's face, thereby detecting the coordinate of each part of the user's face and an image area corresponding to each part of the face. Furthermore, the CPU of the display device 1 acquires a biometric information of the user on the basis of the image area of each part of the detected user's face. Moreover, the CPU determines whether the user has entered a predetermined state on the basis of a change of the biometric information. Thereafter, the display device 1 performs display control on the basis of the determination result.

As an example, the display device 1 measures a pulse wave on the basis of an image of the user's face. Thereafter, the display device 1 compares an average value of a waveform of a pulse wave measured in a first predetermined period with an average value of a waveform of a pulse wave measured in a second predetermined period. Here, for example, when the user performs a treatment on cheeks, the blood flow rate of the entire face increases. Therefore, the average value of the waveform of the pulse wave changes toward the plus direction when compared with the blood flow rate before the treatment (hereinafter, this change is referred to as "DC (Direct Current) offset". The display device 1 measures the DC offset. In a case in which the amount of the change changes by a prescribed amount or more in the plus direction, the display device 1 determines that the treatment has been performed. In order to do this, the display device 1 corrects the average value of the waveform of the pulse wave measured in the first predetermined period by the prescribed amount or more in the plus direction. Thereafter, in a case in which the average value of the waveform of the pulse wave measured in the first predetermined period after the correction becomes substantially the same as the average value of the waveform of the pulse wave measured in the second predetermined period (in other words, in a case in which the average value of the waveform of the pulse wave measured in the first predetermined period after the correction and the average value of the waveform of the pulse wave measured in the second predetermined period are included in a numerical value range that is set in advance), the display device 1 determines that the treatment has ended. Thereafter, the display device 1 performs display control to display information corresponding to new treatment (for example, guidance information relating to how to perform new treatment) from information corresponding to treatment that has already ended (for example, guidance information relating to how to perform treatment that has already ended).

According to such a display device 1, it is possible to determine whether a user as a subject has entered a processing state on the basis of the change of a biometric information value. In other words, it is possible to perform a determination relating to the change of the user. Furthermore, it is possible to perform display control on the basis of such a determination result. In other words, according to the display device 1, it is possible to perform display control of a display device at the timing that is appropriate for the user.

(System Configuration)

FIG. 1 is a configuration diagram illustrating an overall configuration of a display system S including the display device 1 according to the present embodiment. As illustrated in FIG. 1, the display system S includes a plurality of display devices 1, a network 2, and a server group 3. The number of display devices 1 is not particularly limited, and n display devices 1 (n is any natural number) may be included in the display system S. It should be noted that, in the following description, in a case in which n display devices 1 are described without being particularly distinguished from each other, they are referred to as simply a "display device 1" by omitting the letter at the end of a reference numeral.

As described above, the display device 1 performs display control at the timing that is appropriate for a user. The display device 1 is connected to each of the servers included in the server group 3 via the network 2 so that communication can be performed therebetween.

The network 2 is realized by, for example, the Internet, a local area network (LAN), a mobile phone network, or a network in which these networks are combined.

The server group 3 includes various types of servers cooperating with the display device 1. For example, the server group 3 includes an authentication server 301 that authenticates the user of the display device 1. Furthermore, for example, the server group 3 includes an application delivery server 302 that delivers application software for realizing functions of the display device 1. Furthermore, for example, the server group 3 includes a measured data storage server that stores profile information of the user which is information including setting information related to the user, usage history of the display device 1 by the user, and the like. However, this is merely an example, and servers having other functions may be included in the server group 3. Furthermore, a plurality of servers included in the server group 3 may be realized by separate server devices, respectively, or may be realized by a single server device.

(External Configuration)

Figure 2:
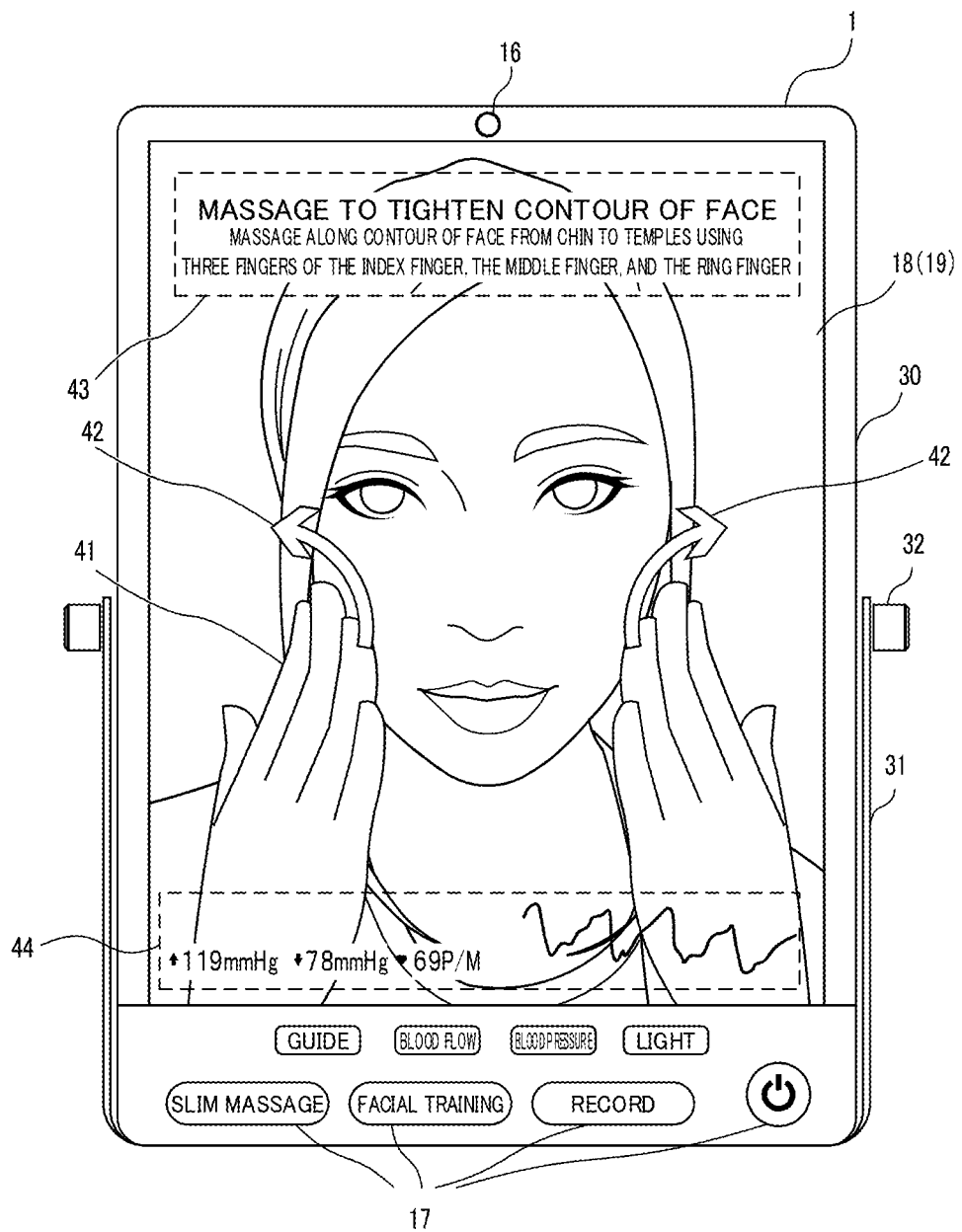
FIG. 2 is a configuration diagram illustrating the external configuration of a front face of a display device according to an embodiment of the present invention.
Figure 3A:
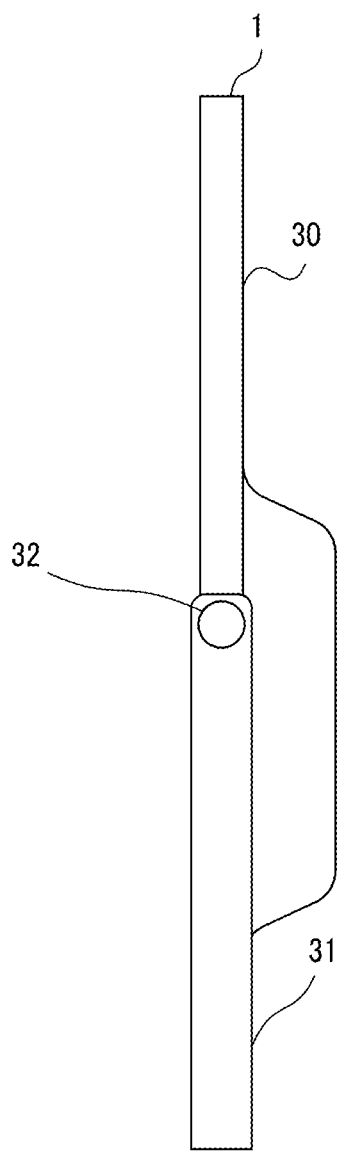
FIG. 3A is a diagram of the external configuration of a side face of a display device according to an embodiment of the present invention, and illustrates the external appearance when carried by a user.
Figure 3B:
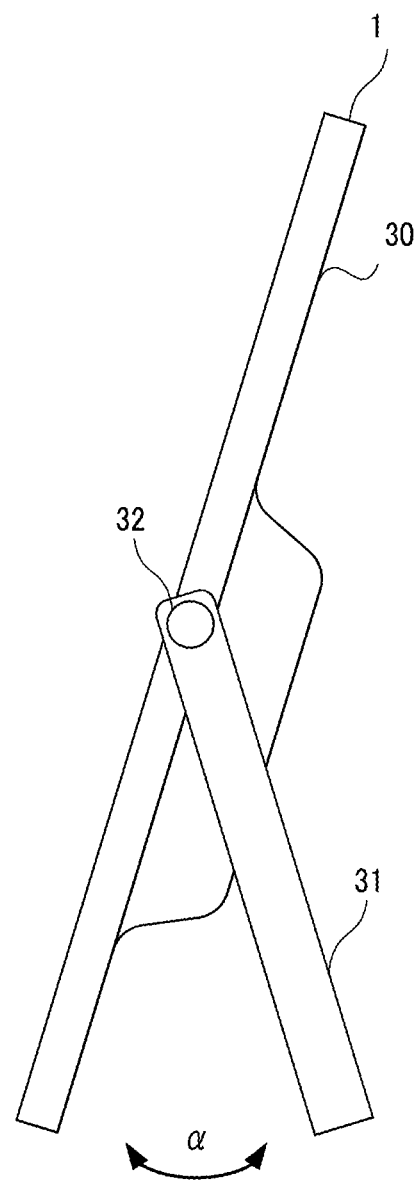
FIG. 3B is a diagram of the external configuration of a side face of a display device according to an embodiment of the present invention, and illustrates the external appearance when installed and used.

FIG. 2 is a configuration diagram illustrating the external configuration of a front face of the display device 1 according to an embodiment of the present invention. FIGS. 3A and 3B are each a configuration diagram illustrating an external configuration of a side face of the display device 1. The front face of the display device 1 is, for example, formed with an A4 size specified in International Organization for Standardization (ISO) 216.

As illustrated in FIGS. 2, 3A, and 3B, the display device 1 includes a main body portion 30, a leg portion 31, and a hinge portion 32. The main body portion 30 is a main body portion including a mirror portion 18, a display portion 19, and other pieces of hardware. Furthermore, the leg portion 31 and the hinge portion 32 are each a member for causing the display device 1 to self-stand. The leg portion 31 is pivotally joined to the main body portion 30 by the hinge portion 32. As illustrated in FIG. 3A, when the display device 1 is carried, the side face of the main body portion 30 and the side face of the leg portion 31 are aligned, so that the user can carry the display device 1 in a non-bulky shape. On the other hand, as illustrated in FIG. 3B, when the display device 1 is installed and used on a desk or the like, the user can cause the display device 1 to self-stand by causing the leg portion 31 to turn around the hinge portion 32. It should be noted that, in order to allow the display device 1 to be able to self-stand, the hinge portion 32 has a structure for holding the leg portion 31 in a state in which a predetermined angle is maintained.

The main body portion 30 includes the mirror portion 18 and the display portion 19. The mirror portion 18 is a semitransparent mirror that has both a transmission property and reflection property as optical properties. The mirror portion 18 is provided on the front face of the main body portion 30 as illustrated. The display portion 19 displays various types of information to a user by displaying them thereon. The display portion 19 displays, for example, a guide image for performing the guidance for massage, and the like, a message of characters, and the like, and biometric information of the user, and the like.

In the display device 1, a reflection face of the mirror portion 18 and a display face of the display portion 19 are arranged in a superimposed manner in a viewing direction of the user facing the mirror portion 18 so that the reflection face of the mirror portion 18 and the display face of the display portion 19 can be visually recognized by the user at the same time. For example, the display portion 19 configured by a liquid crystal display is arranged to overlap, in parallel, an inner side of the mirror portion 18 configured by the semitransparent mirror in the viewing direction. With such an arrangement, the user can visually recognize, at the same time, the user's own face reflected by the mirror portion 18 (corresponding to a mirror image 41 in the figure) and various types of information displayed on the display portion 19 and transmitted through the mirror portion 18 (guidance information 42 for massage, and the like, a message 43, a dashed-line rectangular area 44 displaying biometric information data of the user such as a maximum blood pressure value, a minimum blood pressure value, an average pulse rate, pulse wave and, waveform data).

As illustrated in FIG. 2, the display device 1 further includes an image capturing portion 16 and an input portion 17.

The image capturing portion 16 captures, as a subject, the user facing the mirror portion 18 upon use of the display device 1. The image capturing portion 16 is provided at a location where a facial image of the user facing the mirror portion 18 can be captured. For example, as illustrated in the figure, the image capturing portion 16 is provided on the front face of the main body portion 30 and at the upper portion of the mirror portion 18.

The input portion 17 receives an operation input by the user. The input portion 17 is realized by, for example, a plurality of buttons. In the figure, buttons for switching to various types of modes such as slim face, facial training, and biometric information recording, and a button for powering on-off the display device 1 are illustrated as an example.

The external structure of the display device 1 is described as above. However, this structure is merely an example, and the external structure of the display device 1 is not limited to this example.

For example, the display device 1 may further include a light emitting portion that emits light for illuminating the user at the location facing the mirror portion 18. The light emitting portion illuminates the user by adjusting illuminance and the color components, whereby the display device 1 functions as a mirror with illumination. A plurality of light emitting portions may be provided. Furthermore, the light emitting portion may be provided at the upper portion or the lower portion of the mirror portion 18, or alternatively, may be provided at the entire periphery of the mirror portion 18.

Furthermore, for example, the number or the arrangement of the input portions 17 may be changed. Furthermore, for example, a part of the display portion 19 may be configured as a touch screen, and the input portion 17 and the display portion 19 may be configured integrally.

Furthermore, for example, instead of configuring the mirror portion 18 by a semitransparent mirror and configuring the display portion 19 by a common liquid crystal display as described above, the mirror portion 18 may be configured by a common mirror, and the display portion 19 may be configured by a transmissive liquid crystal display. In such a case, it is desirable for the mirror portion 18 to be configured by a common mirror arranged to overlap, in parallel, an inner side of the display portion 19 configured by a transmissive liquid crystal display in the viewing direction.

(Hardware Configuration)

Figure 4:
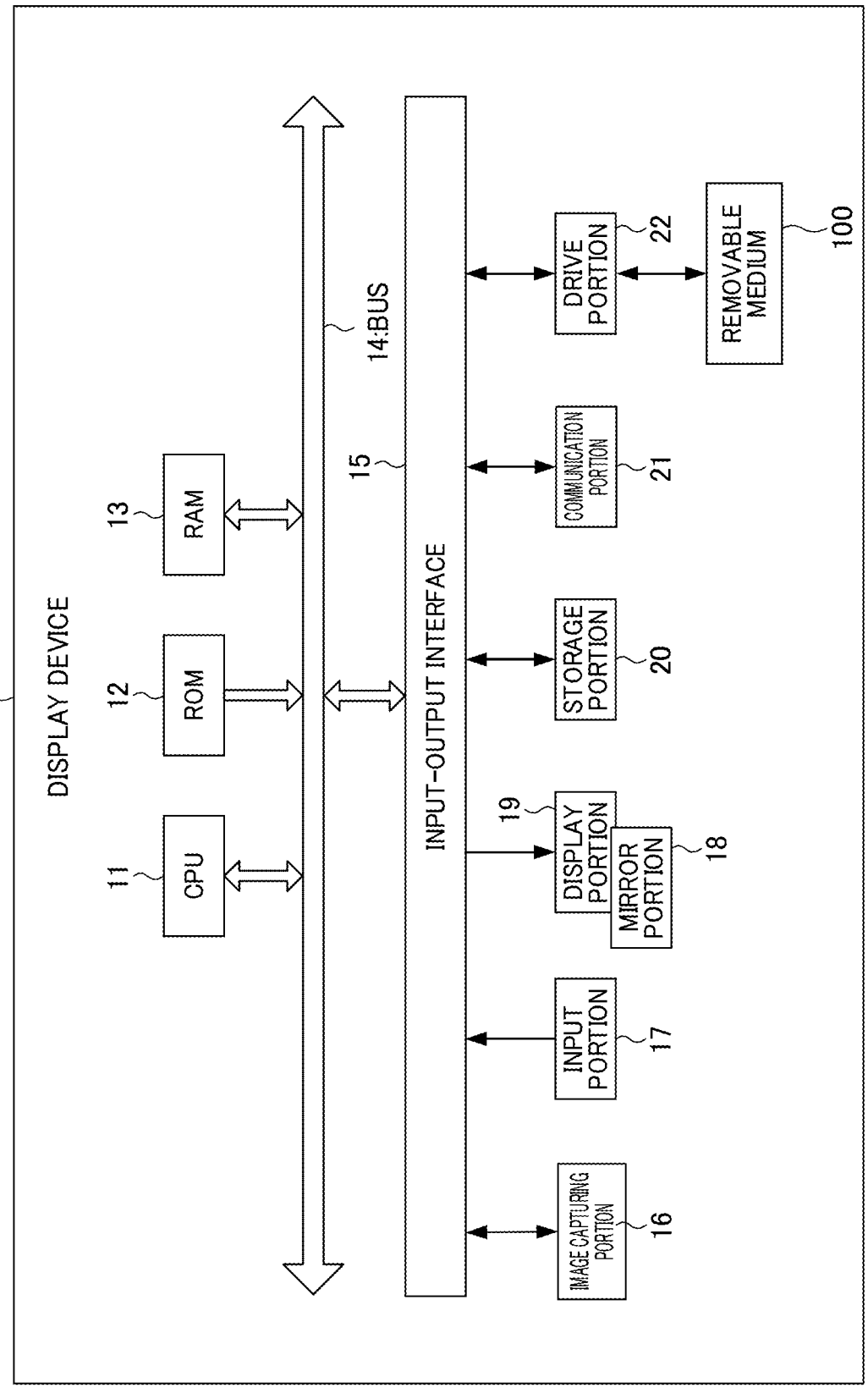
FIG. 4 is a block diagram illustrating the hardware configuration of a display device according to an embodiment of the present invention.

FIG. 4 is a block diagram illustrating the hardware configuration of the display device 1. As illustrated in FIG. 4, the display device 1 includes a central processing unit (CPU) 11, read only memory (ROM) 12, random access memory (RAM) 13, a bus 14, an input-output interface 15, the image capturing portion 16, the input portion 17, the mirror portion 18, the display portion 19, a storage portion 20, a communication portion 21, a drive portion 22, and a removable medium 100.

The CPU 11 executes various processing according to programs that are recorded in the ROM 12, or programs that are loaded from the storage portion 20 to the RAM 13.

The RAM 13 also stores data and the like necessary for the CPU 11 to execute the various processing, as appropriate.

The CPU 11, the ROM 12 and the RAM 13 are connected to one another via the bus 14. The input-output interface 15 is also connected to the bus 14. The image capturing portion 16, the input portion 17, the display portion 19, the storage portion 20, the communication portion 21, and the drive portion 22 are connected to the input-output interface 15.

The image capturing portion 16 includes an optical lens portion and an image sensor, which are not illustrated. In order to photograph a subject, the optical lens portion is configured by a lens for condensing light, e.g. a focus lens, a zoom lens, etc. The focus lens is a lens for forming an image of a subject on the light receiving surface of the image sensor. The zoom lens is a lens that causes the focal length to freely change in a certain range. The image capturing portion 16 also includes peripheral circuits to adjust setting parameters such as focus, exposure, white balance, and the like, as necessary.

The image sensor is configured by an optoelectronic conversion device, an AFE (Analog Front End), and the like. The optoelectronic conversion device is configured by a CMOS (Complementary Metal Oxide Semiconductor) type of optoelectronic conversion device and the like, for example. Light incident through the optical lens portion forms an image of a subject in the optoelectronic conversion device. Therefore, the optoelectronic conversion device optoelectronically converts (i.e. captures) the image of the subject, accumulates the resultant image signal for a predetermined time interval, and sequentially supplies the image signal as an analog signal to the AFE. The AFE executes a variety of signal processing such as A/D (Analog/Digital) conversion processing of the analog signal. The variety of signal processing generates a digital signal that is output as an output signal from the image capturing portion 16. Such an output signal of the image capturing portion 16 is supplied appropriately to the CPU 11, etc.

The input portion 17 is configured by various buttons, a microphone, and the like, and inputs a variety of information in accordance with instruction operations or instruction voices by the user.

The mirror portion 18 is a semitransparent mirror that has both transmission characteristics and reflection characteristics as optical characteristics. The mirror portion 18 transmits display by the display portion 19 in the area where the display of the display portion 19 is displayed. On the other hand, the mirror portion 18 reflects, as a mirror image, an image such as a user displayed in the display device 1 in a region where the display by the display portion 19 is not performed.

The display portion 19 includes a liquid crystal display or the like, and displays an image corresponding to image data outputted from the CPU 11. The arrangement of the display portion 19 and the mirror portion 18 is described as above with reference to FIG. 2.

The storage portion 20 includes semiconductor memory such as a dynamic random access memory (DRAM) and stores various types of data.

In the communication portion 21, the CPU 11 performs communication control for performing communication with other devices (for example, each server included in the server group 3) via the network 2.

The drive portion 22 is configured by an interface onto which a removable medium 100 can be loaded. The removable medium 100 including a magnetic disk, an optical disk, a magneto-optical disk, a semiconductor memory or the like is appropriately loaded onto the drive portion 22. The removable medium 100 stores a program for executing display control processing to be described later, and various types of data such as image data. The program or various types of data such as image data read from the removable medium 100 by the drive portion 22 is installed in the storage portion 20 as necessary.

The display device 1 may further include other pieces of hardware in addition to the hardware described above. For example, the display device 1 includes a lamp, a speaker, a vibration motor, or the like, and may include an output portion that outputs light and/or sound, or a vibration signal.

(Functional Configuration)

Figure 5:
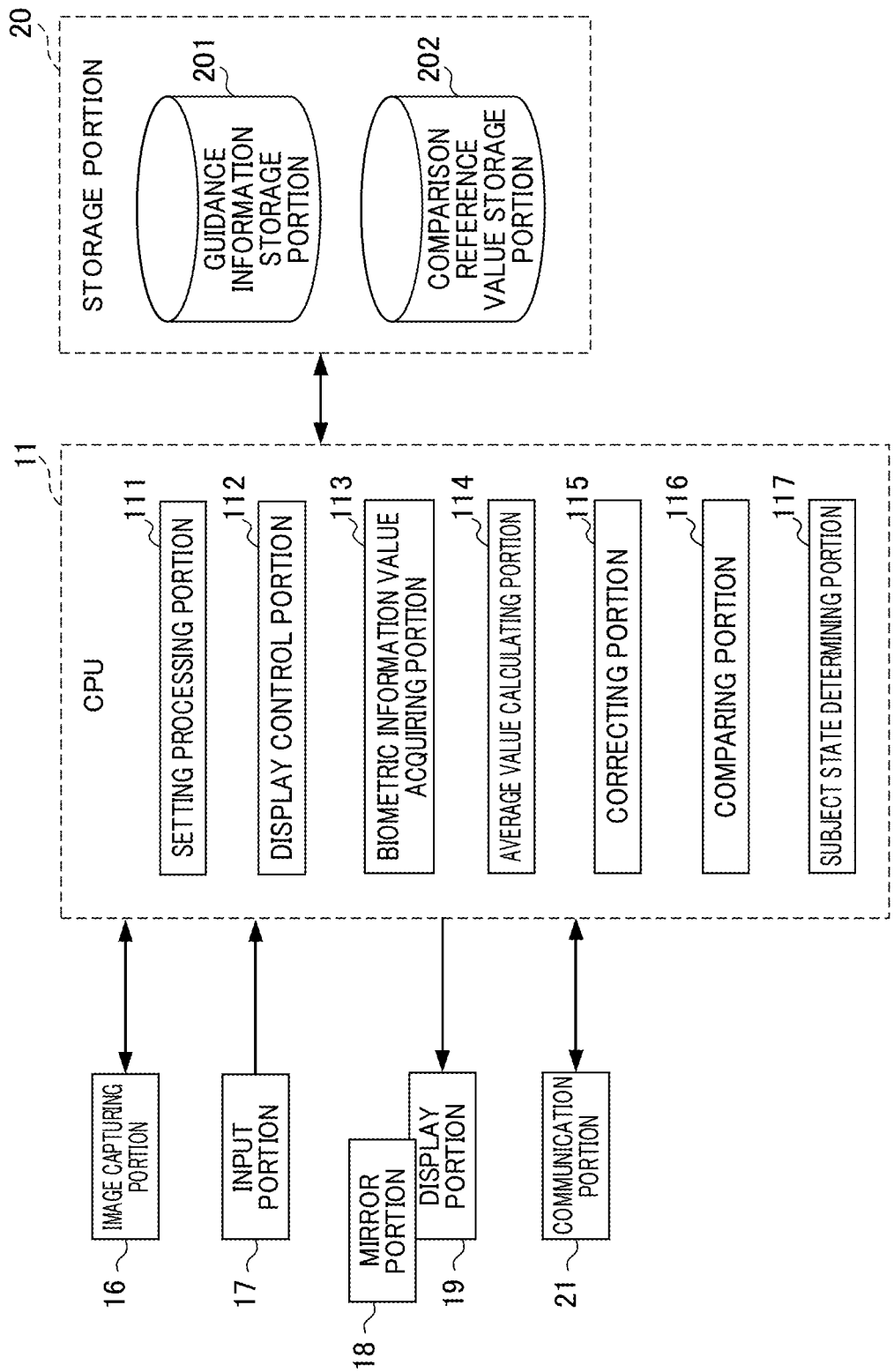
FIG. 5 is a functional block diagram illustrating the functional configuration for executing display control processing among functional configurations of a display device according to an embodiment of the present invention.

FIG. 5 is a functional block diagram illustrating the functional configuration for executing the display control processing in the functional configuration of the display device 1. The display control processing is a sequence of processing of the display device 1 performing display control on the basis of a change in a biometric information value acquired from a user.

In a case in which the display control processing is executed, a setting processing portion 111, a display control portion 112, a biometric information value acquiring portion 113, an average value calculating portion 114, a correcting portion 115, a comparing portion 116, and a subject state determining portion 117 function in the CPU 11 as illustrated in FIG. 5. A guidance information storage portion 201 and a comparison reference value storage portion 202 are set in an area of the storage portion 20.

The guidance information storage portion 201 stores various types of data related to guidance in the display control processing. For example, the guidance information storage portion 201 stores data of a guide image, text data, audio data, and the like for generating the guidance information to be displayed in the display control processing. The guidance information storage portion 201 also stores a display order or a plurality of pieces of guidance information in a series of pieces of guidance, a condition for switching the guidance information for display, to next guidance information, data for generating various types of user interfaces, and the like. Furthermore, the guidance information storage portion 201 stores profile information of the user generated with respect to the display control processing. It should be noted that the guide image may be image data generated in advance, or may be computer graphics (CG) generated in real-time on the basis of arithmetic operation.

The comparison reference value storage portion 202 stores information generated by the biometric information value acquiring portion 113, the average value calculating portion 114, and the correcting portion 115 described later and used by the comparing portion 116 for comparison (hereinafter, referred to as "comparison reference value"). The comparison reference value will be described later in the descriptions for these functional blocks.

It should be noted that each piece of information stored in the guidance information storage portion 201 or the comparison reference value storage portion 202 as described above may be stored only in the storage portion 20, but may also be appropriately stored in the removable medium 100 by the drive portion 22. Furthermore, each piece of information stored in the guidance information storage portion 201 or the comparison reference value storage portion 202 may be appropriately stored in, for example, a measurement data storage server included in the server group 3.

Furthermore, in each functional block described below, coordinate information is set as a prerequisite for performing the display control processing. The coordinate information includes information for defining each coordinate system such as an image capturing coordinate system which is a coordinate system relating to an image captured by the image capturing portion 16, a mirror portion coordinate system which is a coordinate system relating to a reflection face of the mirror portion 18, and a display portion coordinate system which is a coordinate system relating to a display face of the display portion 19, and information indicating corresponding relationships for converting a coordinate in each of the coordinate systems into a coordinate in another coordinate system. With regard to each functional block described below, it is possible to perform the display control processing by converting the coordinate in each coordinate system on the basis of the corresponding relationships of the coordinate in each of these coordinate systems. The corresponding relationship of each of these coordinate systems is set by, for example, calibrations accompanied with the correction of the corresponding relationship by way of, for example, the direction adjustment of an image capturing lens or the adjustment of a zoom factor in the image capturing portion 16 at the time of manufacturing the display device 1. For example, the adjustment of a zoom factor is performed by using both or either of so-called optical zoom performed by the adjustment of a lens position of the image capturing portion 16 or so-called digital zoom in image processing.

The setting processing portion 111 performs control such as settings related to the display control processing. The setting processing portion 111, for example, acquires application software for performing the display control processing from the application delivery server 302 included in the server group 3 and causes the application software to operate. Furthermore, the setting processing portion 111 authenticates the user performing the display control processing by performing communication with the authentication server 301 included in the server group 3. Furthermore, for example, the setting processing portion 111 updates the profile information of the user in the display control processing by performing communication with the measured data storage server 303 included in the server group 3.

Furthermore, the setting processing portion 111 displays a menu for performing guidance on the basis of application software for performing the display control processing. For example, the setting processing portion 111 displays a menu including options for selecting the contents of the guidance such as "massage to slim a face", "facial massage", "measuring biometric information", and "makeup (applying cosmetics)". Furthermore, the setting processing portion 111 receives a selection of any of the contents of the guidance via the input portion 17 or the like, from a user referencing the menu. For example, the setting processing portion 111 receives the selection of "massage to slim a face". With such a configuration, the display control processing is performed for the guidance relating to the massage to slim a face. It should be noted that the massage to slim a face refers to the matter of the user performing on the user's own face, etc., a lymphatic massage or the like for reducing swelling of the face by a massage for causing the lymph to flow.

The display control portion 112 controls display of various types of information (for example, guidance information) in the display control processing. Furthermore, the display control portion 112 realizes a sequence of pieces of guidance by switching the pieces of guidance information on the basis of a determination result of the subject state determining portion 117 described later and causing the display portion 19 to display resultant guidance information. In order to do this, the display control portion 112 reads the guidance information from the guidance information storage portion 201. Thereafter, the display control portion 112 displays the guide image information on the basis of the determination result of the subject state determining portion 117 described later, in an order defined by the guidance information thus read at a location defined by the guidance information thus read.

Thereafter, in a case of the determination result from the subject state determining portion 117 described later indicating that treatment is ongoing, for example, the display control portion 112 continues displaying the guidance information relating to the currently ongoing treatment. On the other hand, in a case of the determination result of the subject state determining portion 117 described later indicating that the treatment has ended, for example, the display control portion 112 performs the display control to display the guidance information corresponding to new treatment from the guidance information corresponding to the treatment which has already ended.

Furthermore, the display control portion 112 may further switch the display of the guidance information on the basis of another condition. For example, in a case of the determination result from the subject state determining portion 117 described later indicating that the treatment is ongoing irrespective of the display of the guidance information of a certain treatment having started and a predetermined period having lapsed, the display control portion 112 may automatically switch or end the display of the guidance information. Furthermore, the display control portion 112 may switch or end the display of the guidance information on the basis of a switch instruction operation or an end instruction operation by the user.

As a specific display method of the guidance information, the display control portion 112 displays a guide image in such a manner that the guide image is superimposed at a location where a mirror image of a predetermined partial area of a user's face, etc., is reflected by the mirror portion 18, for example. For example, a guide image in an arrow shape indicating a hand motion upon a massage is displayed so as to be superimposed at a location where a mirror image of a partial area at which a massage to the user's face is to be performed is reflected, at the timing of performing guidance relating to the massage. The user refers to the superimposed display, whereby it is possible to visually recognize the partial area at which a massage is to be performed, the direction of the massage, and the like, easily by superimposing the display on the user's own mirror image.

It should be noted that, in a case of performing such superimposed display, for example, the biometric information value acquiring portion 113 detects a predetermined partial area of the user captured by the image capturing portion 16 by way of face tracking. Thereafter, the biometric information value acquiring portion 113 acquires a coordinate of the display portion coordinate system which corresponds to a coordinate in the capturing coordinate system of the detected partial area, on the basis of the corresponding relationship of each of the abovementioned coordinate systems. Thereafter, the display control portion 112 can perform the superimposed display by displaying a processed guide image on the coordinate of the display portion coordinate system acquired by the biometric information value acquiring portion 113 of the display portion 19.

Furthermore, the display control portion 112 may automatically arrange and display a direction in which the user faces, a massage method, and the like, with an image or a text in a series of pieces of guidance in an area not overlapping with a mirror image of the user's face, etc. (in other words, an area not superimposing on the user's face). Furthermore, for example, the display control portion 112 may automatically arrange and display wave data, necessary letters, or image information for displaying the biometric information in an area not overlapping with a mirror image of a user's face, etc. (in other words, an area not superimposing on the user's face).

Furthermore, the display control portion 112 may combine these displays. For example, the display control portion 112 may display the arrow indicating a hand motion upon a massage so as to be superimposed on the area overlapping with a mirror image such as the user's face, etc., and may display the text indicating the contents of the massage in an area not overlapping with the mirror image of the user's face, etc.

The display control portion 112 displays such information in real-time on the basis of the determination result of the subject state determining portion 117 described later, and thus, it is possible to perform a sequence of guidance appropriately in a manner that is easy to be conveyed to the user.

It should be noted that the display control portion 112 may output the guidance information in another method, in addition to the display. For example, the display control portion 112 may read the guidance information including sound data, and may output, from the speaker, a sound or music created from the guidance information thus read. Furthermore, for example, the display control portion 112 may change a light emitting state by the light emitting portion.

The biometric information value acquiring portion 113 acquires information relating to a user as a subject of image capturing by the image capturing portion 16 in the display control processing (hereinafter, referred to as "subject information"). The subject information refers to, for example, coordinates indicating a location of each part of the user's face, etc., a color of each part of the user's face, etc., and biometric information of the user, etc.

In order to acquire the subject information, the biometric information value acquiring portion 113 analyzes an image including the user as a subject which is captured by the image capturing portion 16 and detects a state of the user included in the image. For example, the biometric information value acquiring portion 113 performs processing relating to pattern matching for a contour and parts or face tracking such as skin color identification on the facial image including the user's face, and thereby recognizes a face contour, an eye position, or a skin area, and detects a predetermined partial area such as a forehead, a cheek, a chin, and a neck. Thereafter, the biometric information value acquiring portion 113 detects a coordinate, a skin color of the user, an angle of the user's face (i.e., the direction of the user's face) of each of the partial areas thus detected.

Furthermore, the biometric information value acquiring portion 113 sequentially measures a biometric information value (may be referred to as "vital data") in a non-contact manner without actually touching the user, thereby sequentially acquiring the biometric information value. In this case, the detected predetermined area corresponds to a region of interest (ROI) for acquiring the biometric information in a non-contact manner. In this case, the biometric information value acquiring device 113 may perform measurement on an image of a region of interest, but also may perform measurement on a plurality of regions of interest. For example, the biometric information value acquiring portion 113 detects, for example, a contour and an eye position in the user's facial image, and automatically recognizes, as regions of interest, a plurality of areas such as a forehead, an eyelid, a cheek, a nose and a part around the nose, a lip and a part around the lip, a chin, a neck, and a decollete part, on the basis of a relative position to the contour and the eye position.

Thereafter, the biometric information value acquiring portion 113, for example, performs measurement by analyzing components in the vicinity of a heartbeat frequency on the basis of a green signal (a luminance value signal corresponding to green pixel) absorbed by subcutaneous blood hemoglobin in this region of interest. For example, the biometric information value acquiring portion 113 calculates the amount of change of a blood amount on the basis of the green signal by performing measurement on the regions of interest of distant two points (for example, a cheek and a forehead, a forehead or a cheek and palm, or the like) at which a pulse delay appears, and calculates the biometric information such as a pulse, a pulse wave, and blood flow on the basis of the amount of change. Alternatively, the biometric information value acquiring portion 113 can measure a pulse wave propagation speed or a variation in blood pressure correlated with the pulse wave propagation speed. In this case, the biometric information value acquiring portion 113 may perform noise removal or the like on the measured biometric information. Furthermore, the difference in surface temperature may be measured by using an infrared camera.

In the present embodiment, as an example, the biometric information value acquiring portion 113 sequentially performs measurement on the luminance of the green signal absorbed by subcutaneous blood hemoglobin, with the regions of interest of distant two points at which a pulse delay appears as a target, to thereby sequentially acquire a waveform corresponding to a pulse wave.

It should be noted that the measurement of the biometric information by the biometric information value acquiring portion 113 can be performed using a technique described in the following reference document.

REFERENCE DOCUMENT

Tohoku University Cyber Science Center Advanced Information Technology Research Division, Tohoku university Innovative innovation research organization, "Success in Development of Blood State Monitoring Device "Magic Mirror,"" [online], Sep. 27, 2016, [searched on Sep. 27, 2018], Internet <URL:http://www.tohoku.ac.jp/japanese/newimg/pressimg/tohokuuniv-press20160927_01web.pdf>

The biometric information value acquiring portion 113 outputs the biometric information value sequentially acquired in this way (here, the luminance of the green signal indicating the waveform corresponding to the pulse wave) to the average value calculating portion 114 in order to perform processing described later. Furthermore, the biometric information value acquiring portion 113 also outputs other pieces of subject information to the display control portion 112 for the display control by the display control portion 112.

The average value calculating portion 114 calculates an average value of a biometric information value sequentially acquired by the biometric information value acquiring portion 113. For example, the average value calculating portion 114 calculates an average value of biometric information values in a predetermined period (for example, a period of about several seconds in which waveforms of a plurality of wave pulses are included). In order to do this, the average value calculating portion 114 samples the biometric information value in a predetermined cycle in a predetermined period, and averages the sampled value to thereby calculate a resultant value as an average value of the biometric information value in a predetermined period.

Alternatively, the average value calculating portion 114 continuously samples for a predetermined period, to thereby detect a biometric information value at the peak in the plus direction and a biometric information value at the peak in the minus direction of a waveform of a pulse wave included in the predetermined period. Thereafter, the average value calculating portion 114 averages the biometric information value at the peak in the plus direction and the biometric information value at the peak in the minus direction of the waveform of the pulse wave thus detected, and calculates an average value of the biometric information value in a predetermined period. Thereafter, the average value calculating portion 114 outputs the average value of the biometric information value in the predetermined period calculated in this way to the correcting portion 115 and the comparing portion 116 described later.

The correcting portion 115 corrects the average value of the biometric information value in a first predetermined period (for example, a predetermined period of time upon the start of guidance) which is outputted from the average value calculating portion 114. For example, the correcting portion 115 corrects the average value of the biometric information value in the first predetermined period outputted by the average value calculating portion 114 in the plus direction. Thereafter, the correcting portion 115 stores the average value of the biometric information value in the first predetermined period after correction, in the comparison reference value storage portion 202, as a comparison reference value.

The comparing portion 116 compares the comparison reference value stored in the comparison reference value storage portion 202 (i.e. the average value of the biometric information value in the first predetermined period after correction) with an average value of the biometric information value of the second predetermined period outputted by the average value calculating portion 114 (for example, a predetermined period which comes periodically from the time of the start of guidance after the lapse of several minutes). Thereafter, the comparing portion 116 outputs a comparison result to the subject state determining portion 117.

The subject state determining portion 117 determines whether the user has entered a predetermined state on the basis of the comparison result by the comparing portion 116. For example, in a case in which, in the comparison by the comparing portion 116, the comparison reference value becomes substantially the same as the average value of the biometric information value in the second predetermined period (i.e. in a case in which the average value of the waveform of the pulse wave measured in the first predetermined period after correction and the average value of the waveform of the pulse wave measured in the second predetermined period are included in a numerical value range that is set in advance), the subject state determining portion 117 determines that the user has entered a predetermined state. On the contrary, in a case in which, in the comparison by the comparing portion 116, the comparison reference value does not become substantially the same as the average value of the biometric information value in the second predetermined period (in other words, in a case in which the average value of the waveform of the pulse wave measured in the first predetermined period after correction and the average value of the waveform of the pulse wave measured in the second predetermined period fall outside a numerical value range that is set in advance), the subject state determining portion 117 determines that the user has not entered a predetermined state. It should be noted that the correction amount by the correcting portion 115 and the references that have become substantially the same in the determination of the subject state determining portion 117 can be set appropriately according to the kind of biometric information value as a measurement target and the contents of guidance. Furthermore, these can also be set appropriately according to the average value of measurement history of a biometric information value of each user, the average value of measurement history of a biometric information value of a plurality of users, and the like.

The subject state determining portion 117 that has performed a determination in this way outputs a determination result to the display control portion 112. As described above, the display control portion 112 performs the display control of display on the display portion 19 on the basis of a determination result by the subject state determining portion 117. For example, in a case in which the user has not entered a predetermined state, the display control portion 112 continues the display of guidance information which is currently being displayed. On the contrary, in a case in which the user has entered a predetermined state, the display control portion 112 switches the display of guidance information that is currently being displayed to start a new display of guidance information.

(Theory of Comparison Determination)

Figure 6:
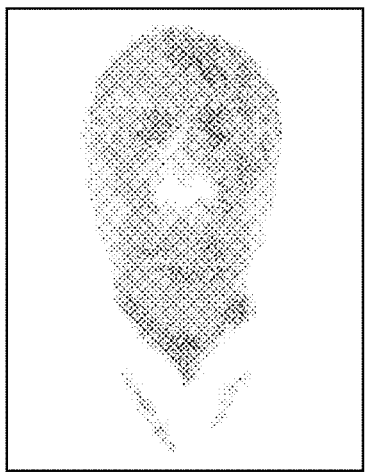
FIG. 6 is a schematic diagram illustrating a change of a user owing to a treatment in display control processing executed by a display device according to an embodiment of the present invention.
Figure 6:
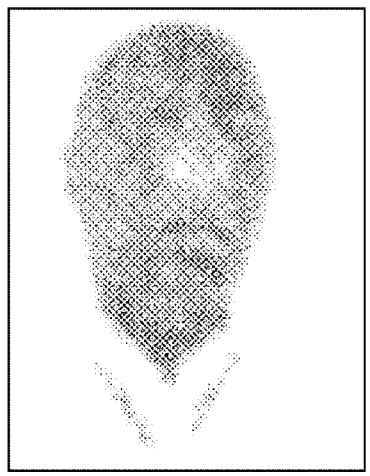
Figure 6:
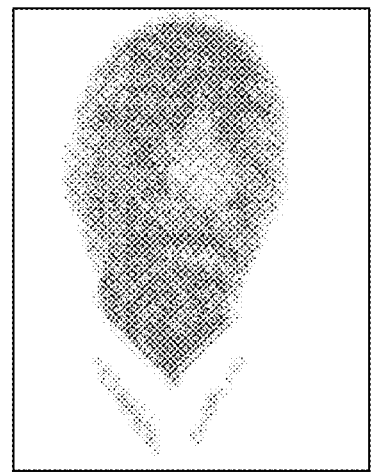
Figure 7:
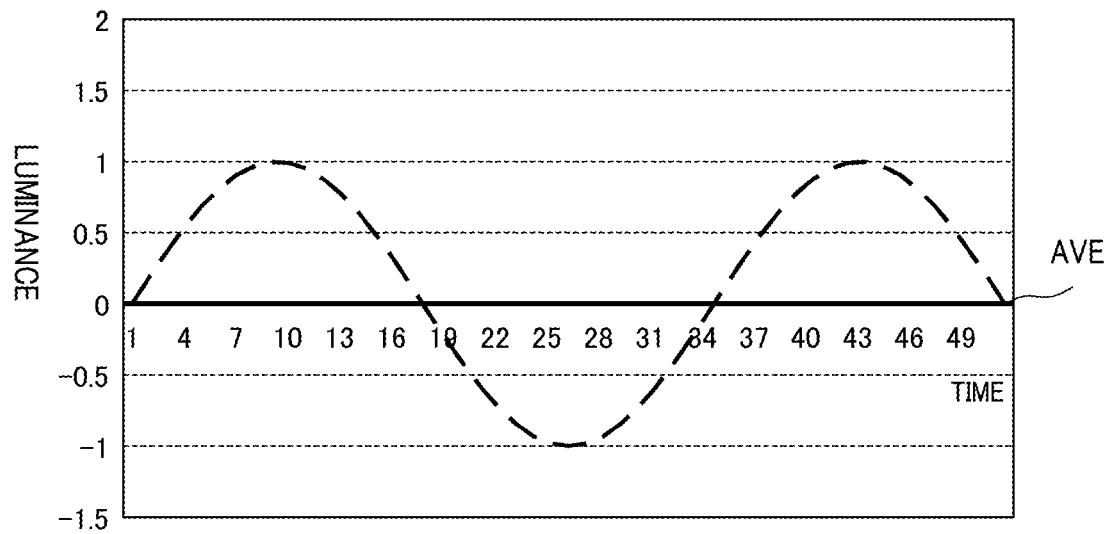
FIG. 7 is a schematic diagram illustrating pulse wave data before a treatment in display control processing executed by a display device according to an embodiment of the present invention.
Figure 8:
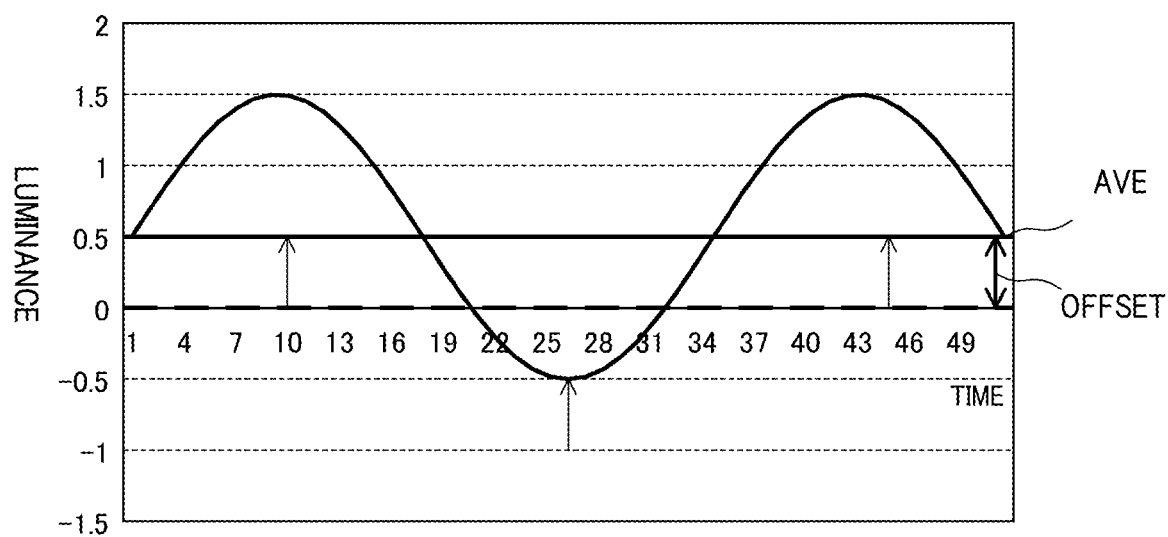
FIG. 8 is a schematic diagram illustrating pulse wave data after a treatment in display control processing executed by a display device according to an embodiment of the present invention.

Each functional block has been described as above. Next, with reference to FIGS. 6, 7, and 8, a comparison determination will be described which is performed by each functional block described above cooperating with one another. Here, FIG. 6 is a schematic diagram illustrating a change of a user owing to treatment in the display control processing. Furthermore, FIG. 7 is a schematic diagram illustrating pulse wave data before treatment in the display control processing. Moreover, FIG. 8 is a schematic diagram illustrating pulse wave data after treatment in the display control processing.

As described above, in the present embodiment, a pulse wave is measured on the basis of a user image. Here, when the user performs a treatment on cheeks (for example, a massage), the blood flow rate of the entire face increases over time. Therefore, the average value of a waveform of a pulse wave changes toward the plus direction when compared with the blood flow rate before treatment. In other words, a DC offset is generated. For example, in FIG. 6, as illustrated in (A), (B), and (C), after the start of the massage, the luminance of the green signal absorbed by subcutaneous blood hemoglobin, which indicates the blood flow rate of the entire face, becomes higher over time. It should be noted that, for the purpose of illustration, the luminance is indicated by the density of hatching.

In a case in which this is expressed as a waveform (here, a waveform of a pulse wave) indicated by a biometric information value acquired by the biometric information value acquiring portion 113, the waveform becomes a waveform that changes over time, as illustrated in FIG. 7. The waveform illustrated in FIG. 7 is a waveform of a pulse wave before treatment, and thus is a waveform in the first predetermined period. It should be noted that, in the drawings, the waveform is schematically indicated as a sine wave; however, this is for convenience of explanation, and thus, the waveform is not necessarily such a sine wave. A value made by the average value calculating portion 114 averaging this waveform is illustrated as a pulse wave average value AVE in the drawings. Similarly, in FIG. 8, a waveform of a pulse wave after treatment, i.e. a waveform in the second predetermined period, is illustrated. Furthermore, similarly to FIG. 7, in FIG. 8, the value made by the average value calculating portion 114 averaging this waveform is illustrated as the pulse wave average value AVE in the drawings.

Here, the pulse wave average value before and after treatment changes by the DC offset (OFFSET). In the present embodiment, this DC offset is measured and, in a case in which the amount of the change changes by a prescribed amount or more in the plus direction, it is determined that the treatment has been performed. Therefore, as described above, the correcting portion 115 corrects the average value AVE of a waveform of a pulse wave measured in the first predetermined period by the prescribed amount or more in the plus direction to thereby establish a comparison reference value. Thereafter, in a case in which, on the basis of the comparison result by the comparing portion 16, the comparison reference value becomes substantially the same as the average value of a waveform of a pulse wave measured in the second predetermined period (in other words, in a case in which the average value of a waveform of a pulse wave measured in the first predetermined period after correction and the average value of a waveform of a pulse wave measured in the second predetermined period are included in a numerical value range that is set in advance), the subject state determining portion 117 determines that the treatment has ended. Thereafter, on the basis of this determination result, the display control portion 112 performs the display control to display the guidance information corresponding to new treatment (for example, guidance information relating to how to perform new treatment) from the guidance information corresponding to the treatment which has already ended (for example, guidance information relating to how to perform the treatment that has already ended). The comparison determination in the present embodiment is described above.

It should be noted that the DC offset may be generated in the minus direction, depending on the kind of treatment and the kind of a biometric information value. For example, the DC offset may be generated in the minus direction in a case of a treatment which makes a user relaxed and a blood pressure and a pulse in which the biometric information value decreases along with the user's relaxed state. In such a case, the average value AVE of a waveform of a pulse wave measured in the first predetermined period may be corrected by the prescribed amount or more in the minus direction to thereby establish a comparison reference value.

(Display Control Processing)

Figure 9:
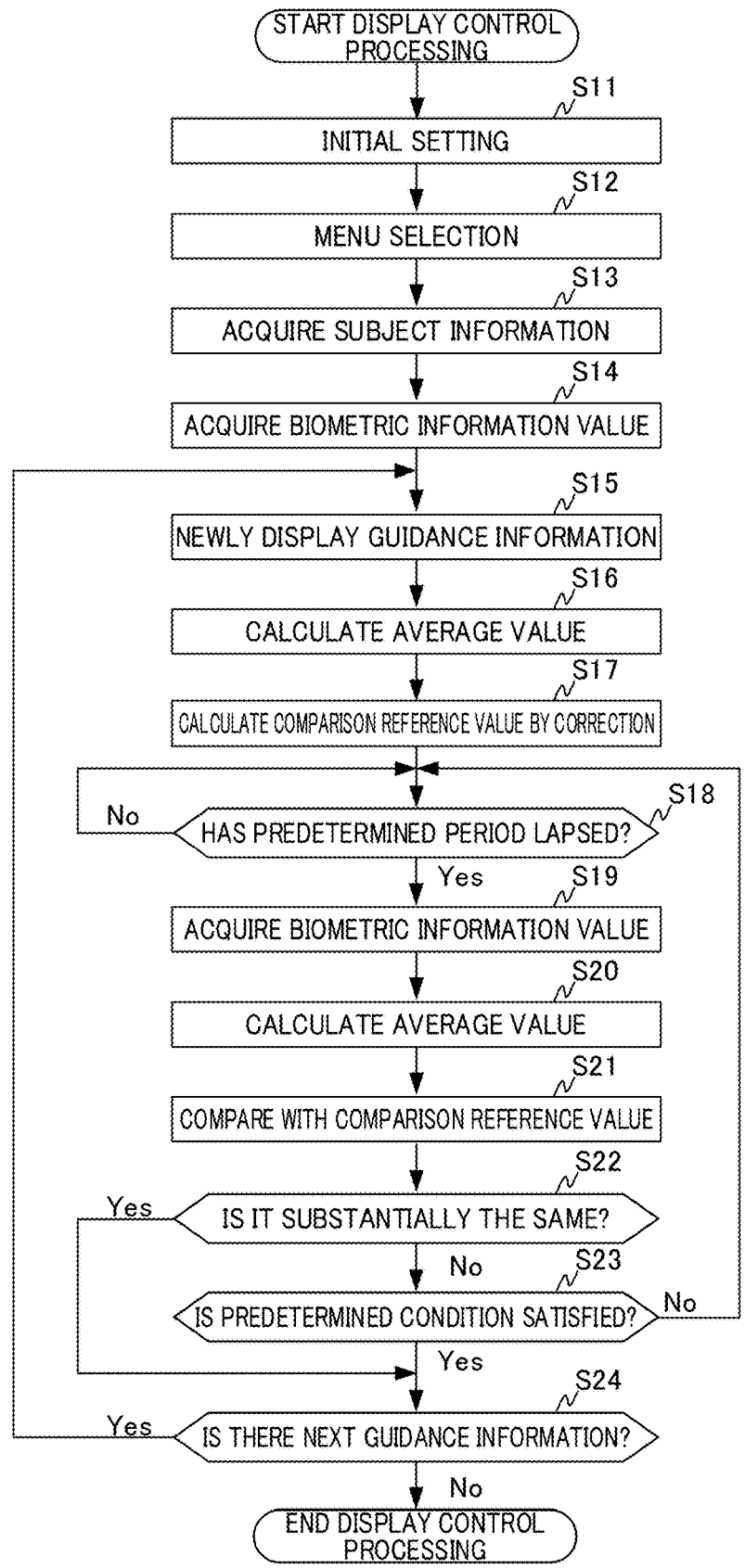
FIG. 9 is a flowchart illustrating a flow of display control processing executed by a display device according to an embodiment of the present invention.

FIG. 9 is a flowchart illustrating a flow of the display control processing executed by the display device 1 of FIG. 1 having the functional configuration of FIG. 5. Further, FIG. 10 is a schematic view illustrating a transition of a display example in the display control processing. The display control processing is started, for example, when the display device 1 is powered on, or when the manipulation of the display control processing by a user is started.

In Step S11, the setting processing portion 111 performs initial setting. For example, the setting processing portion 111 acquires application software for performing the display control processing from the application delivery server 302 included in the server group 3, and causes the application software to be operated. Furthermore, in accordance with the operation of the application software, the setting processing portion 111 performs setting of each piece of hardware of the image capturing portion 16, etc., according to the application software. Thereafter, the setting processing portion 111 starts image capturing by the image capturing portion 16.

In Step S12, the setting processing portion 111 performs a menu selection. For example, the setting processing portion 111 selects contents of guidance such as performing "massage to slim a face", "facial massage", "measuring biometric information", or "makeup (applying cosmetics)" in accordance with a selecting manipulation by a user.

In Step S13, the biometric information value acquiring portion 113 performs tracking, etc., to start acquiring subject information. In this case, as a superimposing display in the mirror portion 18 and the display portion 19, for example, as illustrated in FIG. 10(A), guide information 151 for tracking is displayed on a mirror image of a user's face. The user adjusts a face position on the basis of this guide information 151. This makes it possible to perform tracking quickly.

In Step S14, the biometric information value acquiring portion 113 acquires a biometric information value in a predetermined period. This corresponds to the above-described first predetermined period. In this case, as a superimposing display in the mirror portion 18 and the display portion 19, for example, as illustrated in FIG. 10(B), the position 151 of ROI and a biometric information value 152 (herein a hatched region) that are being measured are displayed on the mirror image of the user's face. By referencing this display, the user can recognize that the biometric information value is being acquired.

In Step S15, the display control portion 112 displays new guidance information on the basis of the menu selection in Step S12. In this case, as a superimposing display in the mirror portion 18 and the display portion 19, for example, as illustrated in FIG. 10(C), guidance information for performing a treatment (42 in FIG. 2) is displayed on the mirror image of the user's face. By referring to this guidance information, the user can perform the treatment appropriately by the user's own hand.

In Step S16, the average value calculating portion 114 calculates the average value AVE of the biometric information value in the first predetermined period acquired in Step S14. In Step S17, the correcting portion 115 calculates a comparison reference value by correction.

In Step S18, the biometric information value acquiring portion 113 determines whether a predetermined period has lapsed since the display of the guidance information (i.e. since the start of the treatment by the user) in Step S15 to enter the second predetermined period. In a case in which the predetermined period has lapsed to enter the second predetermined period, it is determined as YES in Step S18, and the processing advances to Step S19. On the contrary, in a case of the predetermined period having lapsed but not having entered the second predetermined period, it is determined as NO in Step S18, and the determination in Step S18 is repeated.

In Step S19, the biometric information value acquiring portion 113 acquires a biometric information value in a predetermined period. This corresponds to the above-described second predetermined period. In Step S20, the average value calculating portion 114 calculates the average value AVE of the biometric information value in the second predetermined period acquired in Step S19.

In Step S21, the comparing portion 116 compares the comparison reference value calculated by the correcting portion 115 in Step S17 with the biometric information value in the second predetermined period calculated by the average value calculating portion 114 in Step S20. In Step S22, the subject state determining portion 117 determines, on the basis of the comparison result by the comparing portion 116, whether the comparison reference value has become substantially the same as the average value of the waveform of the pulse wave measured in the second predetermined period (i.e. whether the average value of the waveform of the pulse wave measured in the first predetermined period after correction and the average value of the waveform of the pulse wave measured in the second predetermined period are included in a numerical value range that is set in advance). In a case in which the comparison reference value has become substantially the same as the average value of the waveform of the pulse wave measured in the second predetermined period, it is determined as YES in Step S22, and the processing advances to Step S24. On the contrary, in a case in which the comparison reference value does not become substantially the same as the average value of the waveform of the pulse wave measured in the second predetermined period, it is determined as NO in Step S23, and the processing advances to Step S23.

In Step S23, the display control portion 112 determines whether a predetermined condition is satisfied. The predetermined condition refers to, for example, a condition in which a predetermined period has lapsed since the start of the display of guidance information, or a condition in which there has been a switch instruction manipulation by a user, as described above for the description of the functional blocks of the display control portion 112. In a case in which a predetermined condition is satisfied, it is determined as YES in Step S23, and the processing advances to Step S24. On the contrary, in a case in which a predetermined condition is not satisfied, it is determined as NO in Step S23, and the processing returns to Step S18, and the determination is repeated until a predetermined period lapses again and a next second predetermined period comes. In this case, as a superimposing display in the mirror portion 18 and the display portion 19, the display illustrated in FIG. 10(C) is continued, for example.

In Step S24, the display control portion 112 determines whether there is guidance information to be displayed next. In a case in which there is guidance information to be displayed next, it is determined as YES in Step S24, and the processing returns to Step S15. Thereafter, the display control portion 112 newly displays the guidance information to be displayed next, and the processing of Step S16 and later is repeated. In this case, as a superimposing display in the mirror portion 18 and the display portion 19, new guidance information for performing a new treatment is displayed. As illustrated in FIG. 10(D), the user can perform the new treatment appropriately by referencing this new guidance information. On the contrary, in a case in which there is no guidance information to be displayed next, it is determined as NO in Step S24, and the present display control processing ends.

According to the display control processing as described above, it is possible to determine whether a user as a subject enters a processing state on the basis of a change of a biometric information value. Thereafter, it is possible to perform the display control on the basis of such a determination result. In other words, it is possible to perform a determination relating to the change of the user. In other words, by the display device 1 performing the display control processing, it is possible to perform the display control of a display device at the timing that is appropriate for the user.

It should be noted that, in the display control processing performed subsequently, the processing of acquiring an application, etc. in Step S11 may be omitted.

The display device 1 configured as above includes the biometric information value acquiring portion 113, the comparing portion 116, and the subject state determining portion 117. The biometric information value acquiring portion 113 subsequently acquires a biometric information value of a user. The comparing portion 116 compares a first biometric information value that is subsequently acquired by the biometric information value acquiring portion 113 with a second biometric information value which is different from the first biometric information value that is subsequently acquired by the biometric information value acquiring portion 113. The subject state determining portion 117 determines that the user could get a certain improvement owing to the treatment on the user on the basis of a comparison result by the comparing portion 116. This makes it possible to determine whether the user as a subject has entered a processing state on the basis of a change of the biometric information value. In other words, it is possible to determine whether the user could have a certain improvement owing to the treatment on the user. By performing such a determination, it is possible to perform the display control of a display device at the timing that is appropriate for the user.

The display device 1 further includes the correcting portion 115. The correcting portion 115 performs predetermined correction on the first biometric information value to thereby establish a first biometric information value after correction. The comparing portion 116 compares the first biometric information value after correction with the second biometric information value. This makes it possible to determine whether the user as a subject has entered a processing state on the basis of a change of the biometric information value.

In a case in which, in the comparison by the comparing portion 116, the first biometric information value after correction becomes substantially the same as the second biometric information value (i.e. in a case in which the average value of a waveform of a pulse wave measured in the first predetermined period after correction and the average value of a waveform of a pulse wave measured in the second predetermined period are included in a numerical value range that is set in advance), the subject state determining portion 117 determines that the user could have a certain improvement owing to the treatment on the user. This makes it possible to determine whether the user could have a certain improvement owing to the treatment on the user on the basis of the quantitative criterion as to whether two pieces of biometric information become substantially the same.

The display device 1 further includes the display portion 19 and the display control portion 112. The display control portion 112 displays first notification information according to a determination result by the subject state determining portion 117. This makes it possible to display predetermined notification information at the timing that is appropriate for the user in accordance with the determination result.

In a case in which the subject state determining portion 117 determines that the user could have a certain improvement owing to the treatment on the user, the display portion 19 displays second notification information which is different from the first notification information on the display portion 19. This makes it possible to switch and display predetermined notification information at the timing that is appropriate for the user in accordance with the determination result.

The display device 1 further includes the mirror portion 18 which is superimposed on the display portion 19 in the display direction. The display control portion 112 controls display of a predetermined location of the display portion 19 that is superimposed on a mirror image which is reflected on the mirror portion 18 in accordance with the determination result by the subject state determining portion 117. This makes it possible to appropriately superimpose the display of the display portion on the mirror image.

The first biometric information value is a value at the time of starting predetermined procedure on the user. This makes it possible to perform comparison with the time of starting the predetermined procedure (for example, massage).

The first biometric information value and the second biometric information value are acquired in a predetermined period in which the biometric information is acquired by the biometric information value acquiring portion 113 or a predetermined period which is a cyclic range. This makes it possible to make a determination on the basis of biometric information which is difficult to be grasped only by observing an instantaneous value such as a pulse wave, for example.

The display device 1 further includes the average value calculating portion 114. The average value calculating portion 114 calculates an average value from biometric information value. The first biometric information value and the second biometric information value that are subsequently acquired by the biometric information value acquiring portion 113 are average values acquired in a predetermined period. This makes it possible to compare the average values with each other to make a determination.

The display device 1 further includes the image capturing portion 16. The biometric information value acquiring portion 113 subsequently acquires the biometric information value from an image including a user acquired by the image capturing portion 16. This makes it possible to make a determination without being in contact with the user directly.

Even in a case in which, in the comparison by the comparing portion 116, it cannot be determined that the user could have a certain improvement owing to the treatment on the user within a predetermined period since the first biometric information value has been acquired, as long as a predetermined condition is satisfied, the subject state determining portion 117 determines that the user could have a predetermined improvement owing to the treatment on the user. This makes it possible to make a determination in a case in which a predetermined condition such as a user's manipulation or a prescribed lapse of time is satisfied.

(Modification Example)

The present invention is not limited to the above-described embodiment, and modification, improvements, or the like within a scope achieving the object of the present invention are encompassed by the present invention. For example, the embodiment described above may be modified as in the following modified examples.

(Modification Example in which Semitransparent Mirror is Omitted)

The display device 1 may be realized by a device including a configuration in which the mirror portion 18 is omitted. In this case, a user may be captured by the image capturing portion 16, and a captured image of the user's face may be displayed on the display portion 19. For example, the above-described guidance information, biometric information, or information generated from the biometric information may be composited with the captured image of the user's face and may be displayed on the display portion 19. In this case, the captured image of the user's face and other pieces of information may be appropriately arranged, information to be superimposed (for example, a location of a pressure point of the user and an image part of the user corresponding to the pressure point) may be superimposed and displayed on a location corresponding to the user's image, and information that should not be superimposed (for example, biometric information and a central part of the user's face) may be displayed so as not to be superimposed on the user's image. With such a configuration as well, it is possible to exert an effect similar to that of the abovementioned embodiment.

(Modification Example Without Comparison Reference Value)

In the above-described embodiment, the subject state determining portion 117 determines whether the user has entered a predetermined state on the basis of whether, in the comparison by the comparing portion 116, the comparison reference value has become substantially the same as the average value of the biometric information value in the second predetermined period. This is not limitative, and the subject state determining portion 117 may determine whether the user has entered a predetermined state on the basis of whether, in the comparison by the comparing portion 116, the amount of change between the average value of the biometric information value in the first predetermined period and the average value of the biometric information value in the second predetermined period (i.e. a DC offset) has become a predetermined value or more. In other words, the subject state determining portion 117 may determine whether the user has entered a predetermined state by directly comparing the average value of the biometric information value in the first predetermined period with the average value of the biometric information value in the second predetermined period without using the comparison reference value.

(Modification Example Using Biometric Sensor)

In the above-described embodiment, the biometric information value acquiring portion 113 performs measurement of biometric information in a non-contact manner on the user; however, this is not limitative. For example, the biometric information value acquiring portion 113 may perform measurement using a biometric sensor which is in contact with the user. With such a configuration as well, it is possible to exert an effect similar to that of the abovementioned embodiment.

(Other Modification Examples)

For example, in the above embodiment, it is assumed that the display device 1 cooperates with the respective servers included in the server group 3, but the functions of the respective servers may be added to the display device 1, and all the processes may be performed only in the display device 1.

In the above embodiment, the display device 1 to which the present invention is applied has been described with the example of an electronic device incorporated in a portable self-standing mirror, but the present invention is not particularly limited thereto. For example, the present invention can be applied to an electronic device incorporated into a large mirror such as a full-length mirror, an electronic device incorporated into a stationary bathroom vanity, and a mirror-shaped electronic device installed in a bathroom.

The processing sequence described above can be executed by hardware, and can also be executed by software. In other words, the hardware configuration of FIG. 5 is merely an illustrative example, and the present invention is not particularly limited thereto. More specifically, the types of functional blocks employed to realize the above-described functions are not particularly limited to the examples shown in FIG. 5, so long as the display device 1 can be provided with the functions enabling the aforementioned processing sequence to be executed in its entirety.

A single functional block may be configured by a single piece of hardware, a single installation of software, or a combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In a case in which the processing sequence is executed by software, the program configuring the software is installed from a network or a storage medium into a computer or the like. The computer may be a computer embedded in dedicated hardware. Alternatively, the computer may be a computer capable of executing various functions by installing various programs, e.g., a general-purpose personal computer.

The storage medium containing such a program can not only be constituted by the removable medium 100 of FIG. 4 distributed separately from the device main body for supplying the program to a user, but also can be constituted by a storage medium or the like supplied to the user in a state incorporated in the device main body in advance. The removable medium 100 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, ROM 12 of FIG. 4 in which the program is recorded or a hard disk, etc. included in the storage portion 20 of FIGS. 4 and 5.

It should be noted that, in the present specification, the steps defining the program recorded in the storage medium include not only the processing executed in a time series following this order, but also processing executed in parallel or individually, which is not necessarily executed in a time series. In addition, in the present specification, a term system shall mean a general device configured from a plurality of devices, a plurality of means, and the like.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An advising apparatus comprising a processor,
wherein the processor is configured to:
acquire a user's biometric information value as a first biometric information value from a detection portion that detects biometric information of the user;
determine, on a basis of a comparison result generated by comparing the first biometric information value that is acquired, with a second biometric information value after a treatment that is prepared in advance and is obtained in a case of performing the treatment on the user, whether a certain improvement relating to the biometric information of the user is obtained by performing the treatment; and
output information different from information according to the result of the determination in a case in which it is determined that a certain improvement relating to the biometric information of the user is obtained.

2. The advising apparatus according to claim 1,
wherein the processor is configured to perform correction to the first biometric information is acquired, and
compare the first biometric information value after the correction with the second biometric information value.

3. The advising apparatus according to claim 2,
wherein, in a case in which, in the comparison result, the first biometric information value of the user after the correction and the second biometric information value are included in a numerical value range that is set in advance, the processor is configured to determine that a certain improvement relating to the biometric information of the user is obtained by performing the treatment.

4. The advising apparatus according to claim 1,
wherein the processor is configured to control to output information according to a result of the determination in a case in which it is determined that a certain improvement relating to the biometric information of the user is not obtained.

5. The advising apparatus according to claim 4, further comprising a notification portion that performs notification with notification contents based on the information outputted by the processor.

6. The advising apparatus according to claim 5, wherein the notification portion includes a display portion that displays display contents based on the information.

7. The advising apparatus according to claim 6,
wherein a mirror is provided in a display direction of the display portion, and
wherein the processor is configured to control a display location of information to be displayed on the display portion so as to be superimposed on a location of a mirror image of the user reflected by the mirror.

8. The advising apparatus according to claim 1,
wherein the first biometric information value is a value at a time of starting the treatment.

9. The advising apparatus according to claim 1,
wherein the processor is configured to acquire the first biometric information value and the second biometric information value in a predetermined period or within a range of a predetermined cycle.

10. The advising apparatus according to claim 9, wherein the processor is configured to:
acquire a plurality of the first biometric information values and a plurality of the second biometric information values,
calculate average values from the plurality of biometric information values of the user and the plurality of biometric information values after the treatment, and
compare the average values that are calculated.

11. The advising apparatus according to claim 1,
wherein the detection portion includes an image capturing portion, and
the processor is configured to subsequently acquire the first biometric information value from an image including a subject captured by the image capturing portion.

12. The advising apparatus according to claim 1,
wherein the detection portion includes an image acquiring portion, and
the processor is configured to subsequently acquire the first biometric information value from an image including a user acquired by the image acquiring portion.

13. The advising apparatus according to claim 1,
wherein the processor is configured to control to output contents of the treatment as guidance information.

14. The advising apparatus according to claim 1, wherein the detection portion detects biometric information of the user in a non-contact manner.

15. An advising method comprising the steps of:
acquiring a user's biometric information value as a first biometric information value from a detection portion that detects biometric information of the user;
determining, on a basis of a comparison result generated by comparing the first biometric information value that is acquired, with a second biometric information value after a treatment that is prepared in advance and is obtained in a case of performing the treatment on the user, whether a certain improvement relating to the biometric information of the user is obtained by performing the treatment; and
outputting information different from information according to the result of the determination in a case in which it is determined that a certain improvement relating to the biometric information of the user is obtained.

16. A non-transitory storage medium encoded with a computer-readable information processing program that enables a computer to realize functions of:
acquiring a user's biometric information value as a first biometric information value from a detection portion that detects biometric information of the user;
determining, on a basis of a comparison result generated by comparing the first biometric information value that is acquired, with a second biometric information value after a treatment that is prepared in advance and is obtained in a case of performing the treatment on the user, whether a certain improvement relating to the biometric information of the user is obtained by performing the treatment; and
outputting information different from information according to the result of the determination in a case in which it is determined that a certain improvement relating to the biometric information of the user is obtained.

* * * * *